US012785963B2

(12) United States Patent
Li et al.

(10) Patent No.: US 12,785,963 B2
(45) Date of Patent: Nov. 3, 2026

(54) METHOD FOR PERFORMING POLYNOMIAL MULTIPLICATION OPERATIONS

(71) Applicant: THALES DIS FRANCE SAS, Meudon (FR)

(72) Inventors: Xun Li, Meudon (FR); David Vigilant, Angers (FR)

(73) Assignee: THALES DIS FRANCE SAS, Meudon (FR)

( * ) Notice: Subject to any disclaimer, the term of this patent is extended or adjusted under 35 U.S.C. 154(b) by 81 days.

(21) Appl. No.: 18/854,609

(22) PCT Filed: Apr. 3, 2023

(86) PCT No.: PCT/EP2023/058687
§ 371 (c)(1),
(2) Date: Oct. 7, 2024

(87) PCT Pub. No.: WO2023/194309
PCT Pub. Date: Oct. 12, 2023

(65) Prior Publication Data
US 2025/0254044 A1 Aug. 7, 2025

(30) Foreign Application Priority Data
Apr. 6, 2022 (EP) .................................... 22305467

(51) Int. Cl.
*H04L 9/30* (2006.01)
*H04L 9/08* (2006.01)

(52) U.S. Cl.
CPC .......... *H04L 9/3093* (2013.01); *H04L 9/0877* (2013.01)

(58) Field of Classification Search
CPC ............................ H04L 9/3093; H04L 9/0877
See application file for complete search history.

(56) References Cited

U.S. PATENT DOCUMENTS 7,464,128 B1 * 12/2008 Pitsianis ................ G06F 7/724 708/492
8,719,324 B1 * 5/2014 Koc ........................ G06F 7/722 708/491

(Continued)

OTHER PUBLICATIONS

XP055959004—Dec. 22, 2017—Aygun Sercan et al relevant to pp. 0641-0645 relevant to claims 1-9.

(Continued)

*Primary Examiner* — Mohammad W Reza

(57) ABSTRACT

Provided is a method for performing a cryptographic algorithm, performed by a cryptographic device comprising a cryptographic co-processor comprising an integer multiplier, said cryptographic algorithm comprising a polynomial multiplication between a first input polynomial A[X] and a second input polynomial B[X], wherein the first input polynomial A[X] and the second input polynomial B[X] comprise Nc coefficients and said coefficients of the first and second input polynomials are of size Nb bits, with Nc and Nb non-zero integers. A polynomial result is computed for a polynomial multiplication between said first input polynomial A[X] and said second input polynomial B[X] by generating (S11) a concatenated integer for each input polynomial as a concatenation of the coefficients of said input polynomial, each coefficient being extended to a size Ne with $N_e \geq \lceil \log_2 Nc \rceil + 2*N_b$ by inserting zeros as Most Significant Bits of said concatenated coefficients. Other embodiments disclosed.

7 Claims, 5 Drawing Sheets

(56) References Cited

U.S. PATENT DOCUMENTS

| | | | | |
|---|---|---|---|---|
| 2020/0374103 | A1 * | 11/2020 | Cheon | G06F 7/722 |
| 2021/0377026 | A1 * | 12/2021 | Renes | G06F 7/5324 |
| 2022/0286286 | A1 * | 9/2022 | Renes | G06F 7/722 |
| 2022/0366059 | A1 * | 11/2022 | Sasidharan Rajalekshmi | G11C 11/4085 |
| 2023/0236801 | A1 * | 7/2023 | Parhi | G06F 7/5443 708/523 |

OTHER PUBLICATIONS

XP029326499—Nov. 8, 2015—Fournaris Apostolos P et al relevant to pp. 1139-1155 relevant to claims 1-9.

XP061041537—Oct. 13, 2020—Prasanna Ravi et al relevant to pp. 1-39 relevant to claims 1-9.

International Search Report (PCT/ISA/220) and Written Opinion (PCT/ISA/237) mailed on Jun. 15, 2023, by the European Patent Office as the International Searching Authority for current International Application No. PCT/EP2023/058687 [13 pages].

* cited by examiner

Fig. 3

| | | | |
|---|---|---|---|
| | | a1 | a0 |
| x | | b1 | b0 |
| | | R00_H | R00_L |
| | R10_H | R10_L | 0 |
| | R01_H | R01_L | 0 |
| R11_H | R11_L | 0 | 0 |
| R11_H+<br>((R10_H+R01_H+R11_L)+<br>(R10_L+R01_L+R00_H)_H)_H | ((R10_H+R01_H+R11_L)+<br>(R10_L+R01_L+R00_H)_H)_L | (R10_L+R01_L+R00_H)_L | R00_L |

Fig. 6

```
copro_multiply(A=[A0,...,A31], B=[B0,...,B31], C):
        load_extend_to_copro(A%q, reg_a)
        load_extend_to_copro(B%q, reg_b)
        copro_regular_multiplication(reg_a, reg_b, reg_c)
        C = unload_LSB_16bits(reg_c)
Karatsuba_64 (A=[A0,A1], B=[B0,B1], C):
        copro_multiply(A0, B0, C[0:63])
        copro_multiply(A1, B1, C[64:127])
        copro_multiply(A0+B0, A1+B1, T64)
        T64 = T64 - C[0 :63] - C[64 :127]
        C[32:63] += T64[0:31]
        C[64:95] += T64[32:63]
        C[63] = T64[31]
Karatsuba_128 (A=[A0,A1], B=[B0,B1], C):
        Karatsuba_64(A0, B0, C[0:127])
        Karatsuba_64(A1, B1, C[128:255])
        Karatsuba_64(A0+B0, A1+B1, T128)
        T128 = T128 - C[0 :127] - C[128 :255]
        C[64:127] += T128[0:63]
        C[128:191] += T128[64:126]
        C[127] = T128[63]
Karatsuba_256_mod (A=[A0,A1], B=[B0,B1], C, mod):
        Karatsuba_128(A0, B0, C[0:255])
        Karatsuba_128(A1, B1, T1)
        Karatsuba_128(A0+B0, A1+B1, T2)
        T2 = T2 – T1 - C[0 :255]
        C[0:255] -= T1[0:255] // modula x^256+1
        C[128:255] += T2[0:127] % mod
        C[0:127] -= T2[128:255] % mod
        C[255] = T2[127] % mod
```

METHOD FOR PERFORMING POLYNOMIAL MULTIPLICATION OPERATIONS

FIELD

The present invention relates to the field of cryptographic methods and devices, and more particularly to an efficient method for performing polynomial multiplication operations.

BACKGROUND

Cryptographic algorithms are commonly used for ensuring the privacy of communications by encryption, for authentication or for generating a verifiable signature. The increasing computational power of quantum computers is a growing threat to the security of classical schemes such as RSA or ECDSA, which will eventuality be completely defenseless against attacks performed using quantum computers. Therefore, work is being done to develop new efficient cryptographic algorithms that would be resistant against such attacks.

A class of cryptographic algorithms able to resist quantum computers is lattice-based cryptographic algorithms. Such cryptographic algorithms are well positioned to be the next standard for post quantum cryptography. A drawback of such algorithms is that they make an extensive use of polynomial multiplications. Since existing devices don't come with any coprocessor dedicated to such multiplications, such operation have to be computed using the CPU and their cost strongly grows as the number and size of polynomials coefficients increases. Methods have been developed in order to boil down a polynomial multiplication between large polynomials to series of polynomial multiplications between smaller polynomials, such as Karatsuba (https://en.wikipedia.org/wiki/Karatsuba_algorithm), Toom-Cook (https://en.wikipedia.org/wiki/Toom%E2%80%93Cook_multiplication) or methods based on Number Theoric Transform (NTT) (https://en.wikipedia.org/wiki/Discrete Fourier transform (gene ral)).

Nevertheless, the cost of performing a polynomial operation between two large polynomials, such as 256-coefficients polynomials, remains prohibitive for light devices, with low CPU power and memory size, such as smartcards and IoT devices, even when using such advanced methods.

Therefore, there is a need for a method enabling to compute polynomial multiplications between large polynomials at a lower cost than existing methods.

SUMMARY

For this purpose and according to a first aspect, this invention therefore relates to a method for performing a cryptographic algorithm, performed by a cryptographic device comprising a cryptographic co-processor comprising an integer multiplier, said cryptographic algorithm comprising a polynomial multiplication between a first input polynomial A[X] and a second input polynomial B[X], wherein the first input polynomial A[X] and the second input polynomial B[X] comprise Nc coefficients and said coefficients of the first and second input polynomials are of size Nb bits, with Nc and Nb non-zero integers, said method comprising:

a) computing a polynomial result of a polynomial multiplication between said first input polynomial A[X] and said second input polynomial B[X] by:

for each input polynomial, generating a concatenated integer as a concatenation of the coefficients of said input polynomial, each coefficient being extended to a size Ne with $N_e \geq \lceil \log_2 Nc \rceil + 2*N_b$, by inserting zeros as Most Significant Bits of said concatenated coefficients, computing using said integer multiplier a multiplication of said generated concatenated integers to obtain a multiplication result, determining from said multiplication result said polynomial result of a polynomial multiplication between said first input polynomial A[X] and said second input polynomial B[X], b) performing said cryptographic algorithm using said determined polynomial result.

Such a method enables to compute polynomial multiplications between large polynomials at a low cost by narrowing it to one or more integer multiplications without additional complexity due to the carry of the integer multiplications.

Determining said polynomial result may comprise: obtaining coefficients of said polynomial result from least significant bits of each block of bits of length Ne of said multiplication result.

It enables to easily retrieve the coefficients of the seeked polynomial result from the integer multiplication result.

According to an embodiment wherein said cryptographic algorithm comprises computing a multiplication between two polynomials, having a number of coefficients bigger than the number of coefficients Nc of said input polynomials, using Karatsuba algorithm and performing Karatsuba algorithm comprises the computation of the polynomial multiplication between said input polynomials according to the step a) of the method according to the first aspect, and the step of performing said cryptographic algorithm is based on a result of performing Karatsuba algorithm.

It enables to compute polynomial multiplication using the method according to the invention whatever the number of coefficients of the input polynomials by reducing the size of the polynomials used for generating the concatenated integers.

Before generating concatenated integers, coefficients of said input polynomials may be masked using additive or multiplicative masking, and said masked coefficients may be used for generating concatenated integers.

Before computing using said integer multiplier a multiplication of said generated concatenated integers, said concatenated integers may be masked using multiplicative blinding, and said masked concatenated integers may be used for computing said multiplication of concatenated integers.

Such masking techniques enable to protect the polynomial multiplication according to the invention against side-channel attacks.

The cryptographic algorithm may be among: a signature generation, encapsulation, decapsulation, public key encryption or decryption, password-based key exchange algorithm.

According to a second aspect, this invention therefore relates also to a computer program product directly loadable into the memory of at least one computer, comprising software code instructions for performing the steps of the method according to the first aspect when said product is run on the computer.

According to a third aspect, this invention therefore relates also to a non-transitory computer readable medium storing executable computer code that when executed by a cryptographic device comprising a processing system having at least one hardware processor performs the method according to the first aspect.

According to a fourth aspect, this invention therefore relates also to a cryptographic device comprising:

- a processing system having at least one hardware processor and a cryptographic co-processor comprising an integer multiplier configured to perform the method according to the first aspect,
- at least one memory for storing the input polynomial coefficients and the results of the calculations performed during the different computing steps.

BRIEF DESCRIPTION OF THE DRAWINGS

The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

FIG. 3 illustrates schematically a polynomial multiplication performed according to prior art;

FIG. 6 illustrates schematically a method according to an embodiment of the present invention using Karatsuba algorithm.

DETAILED DESCRIPTION

The invention aims at providing a method performing efficiently a polynomial multiplication operation of a cryptographic algorithm. Such a cryptographic algorithm may for example be used for signature generation, encapsulation, decapsulation, public key encryption or decryption, optionally homomorphic, password-based key exchange algorithm. This cryptographic algorithm may be a lattice-based cryptographic scheme such as Saber, Kyber or Dilithium.

Figure 1:
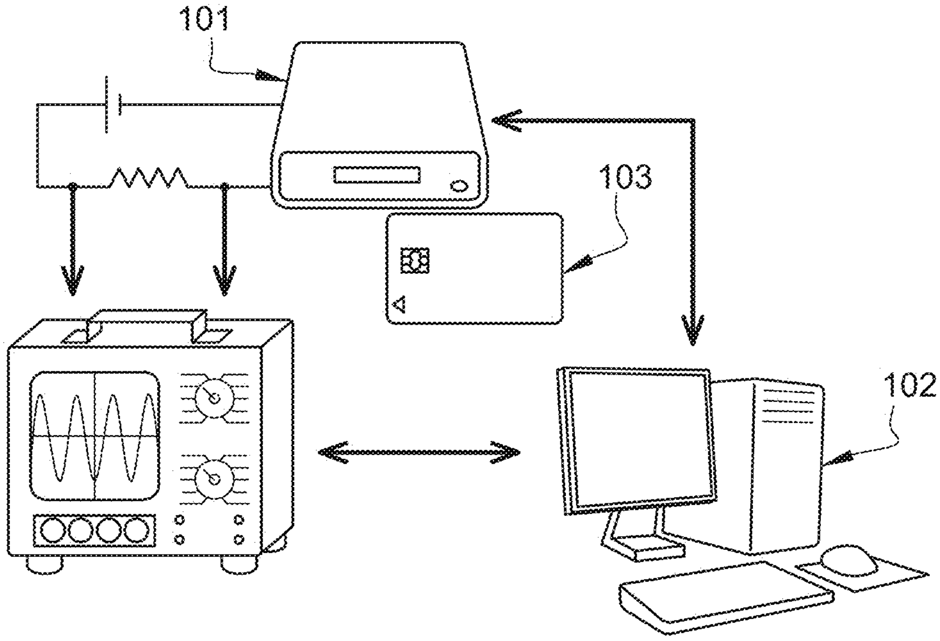
FIG. 1 is a schematic illustration of a system according to an embodiment of the present invention.

As depicted on FIG. 1, this method, and possibly the other steps of the cryptographic algorithm, is performed by a cryptographic device 101. Such a cryptographic device 101 may be connected to a personal computer or server 102 operated by a user and sending commands to the cryptographic device for cryptographic operations such as data encryption or decryption. Alternatively, the cryptographic device 101 may be embedded in the computer 102.

The cryptographic device 101 includes a processing system having at least one hardware processor and a cryptographic co-processor for performing cryptographic operations, and at least one memory configured for storing the data needed for such operations, such as the coefficients of the polynomials used as input to the polynomial operations, intermediate results, mask values. Such a processing system may be comprised in a tamper resistant device 103 secured against any unauthorized access, integrated in the cryptographic device. As an example, the cryptographic device may be a smartcard reader housing a smartcard device, or an electronic device, such as a smartphone or an IoT device, possibly including an integrated or embedded secure element or secured microcontroller. The cryptographic device may also be a dedicated hardware security module.

Figure 2:
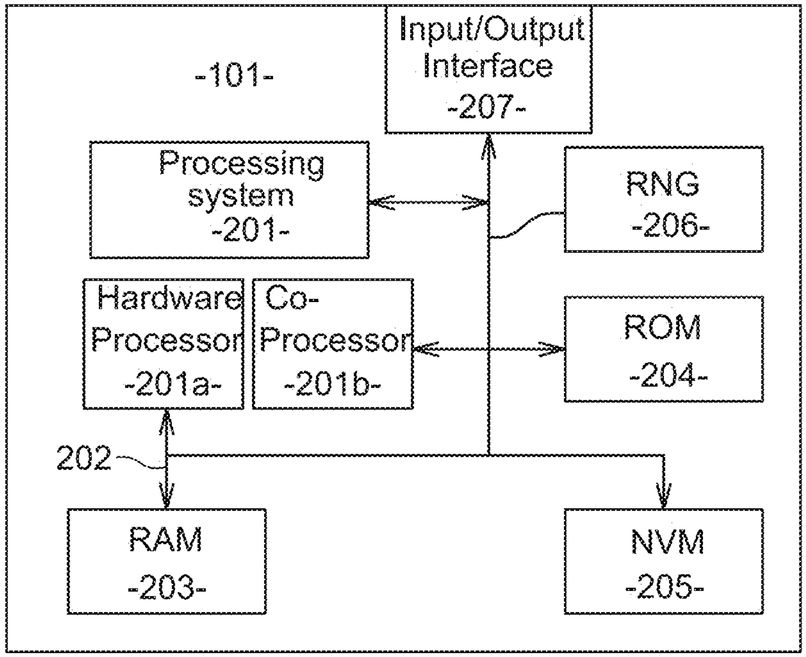
FIG. 2 is a schematic illustration of a cryptographic device according to an embodiment of the present invention.

As depicted on FIG. 2, the cryptographic device 101 may include a processing system 201 having at least one hardware processor **201*a* and a cryptographic co-processor 201*b* comprising an integer multiplier, such as a RSA or ECC coprocessor, connected via a bus 202 to a computer readable memory circuit including a random access memory (RAM) 203, a read-only memory (ROM) 204, and/or a non-volatile memory (NVM) 205. The cryptographic device 101 may also include a random number generator (RNG) 206, included in the hardware processor or connected to it via the bus. The cryptographic device 101 may further include an interface 207 used to connect the cryptographic device 101 to the computer 102. Such an interface may be either a wired interface such as a USB or Thunderbolt interface, or a wireless interface, such as a Bluetooth interface. The interface 207 may also be a communication interface used to connect the cryptographic device 101 to a wireless network, e.g., wide-area networks, WiFi networks, or mobile telephony networks, or to a wired interface such as an Ethernet one, through which communication may be performed with the computer 102**.

The first main idea of the invention in order to make polynomial multiplication much faster is to transform it into a multiplication between two integers by concatenating all the coefficients of each polynomial into a long integer; and to use the co-processor of the processing means to perform this operation at low cost.

In order to be useful for computing the polynomial multiplication, it must be possible to retrieve the coefficients of the sought polynomial resulting from the polynomial multiplication from the result of the corresponding integer multiplication. This is not the case in general because of the multiplication carry. As an example, let us say we want to compute the polynomial multiplication between A[X]=a0+a1*X and B[X]=a0+a1*X with a0, a1, b0 and b1 N-bits integers and let us consider the notations Rij=ai*bj, "_H" the division by 2^N, "_L" the result of a modulo 2^N operation. As shown on FIG. 3, computing the multiplication of a first integer equal to the concatenation of A1|A0 with a second integer equal to B1|B0, with "|" the concatenation operator, gives a result from which no coefficient of A*B can be retrieved easily because in each section of the result many different Rij terms are superimposed as a result of the carry application.

Figure 4:
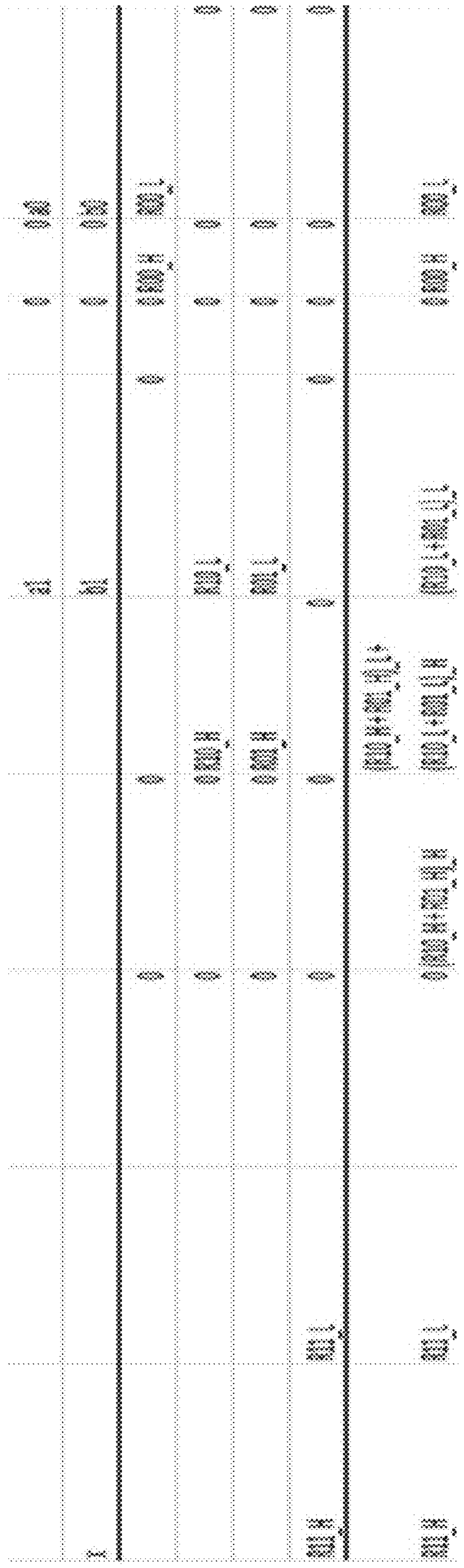
FIG. 4 illustrates schematically a polynomial multiplication performed according to an embodiment of the present invention.

Therefore, a second main idea of the invention is to insert enough zeroes between the coefficients of the polynomials when concatenating them into long integer to avoid such a superimposition of terms when computing the multiplication between the two integers. An example is given on FIG. 4. As in the case of FIG. 3, we try to compute the coefficients of the polynomial equal to A[X]*B[X] by computing the multiplication of two integers formed by concatenating the coefficients of A[X] and B[X] but this time we compute the multiplication of a1|0 . . . 0|a0 with b1|0 . . . 0|b0. By doing so, we obtain a result from which the different Rij terms may be recovered easily.

Figure 5:
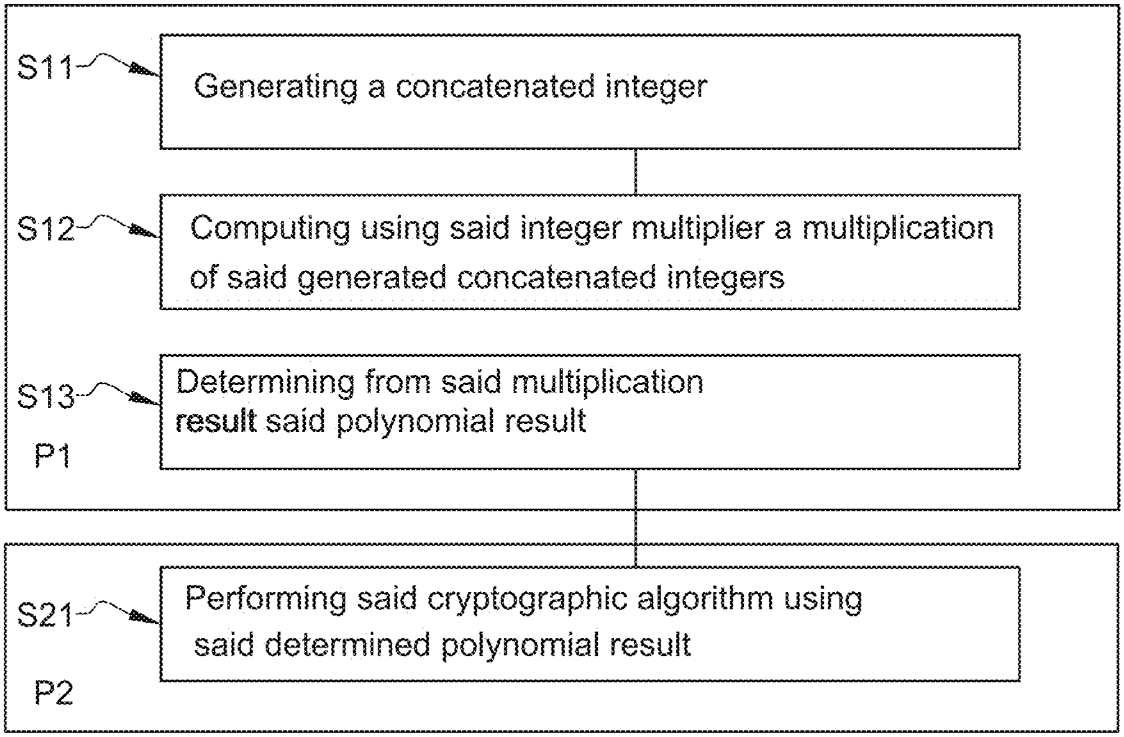
FIG. 5 illustrates schematically a method according to an embodiment of the present invention.

The following paragraphs describe, as depicted on FIG. 5, the steps of a method according to the invention to perform a cryptographic algorithm comprising a polynomial multiplication between a first input polynomial A[X] and a second input polynomial B[X].

The first input polynomial A[X] and the second input polynomial B[X] comprise Nc coefficients of size Nb bits, with Nc and Nb non-zero integers. As an example, the number of coefficients Nc may be equal to a power of two such as 32, 64, 128 or 256, and the size of the coefficients Nb may be equal to 10 or 13.

The method according to the invention may comprise two phases: a multiplication phase P1 during which the cryptographic device computes a polynomial result of the polynomial multiplication between said first input polynomial A[X] and said second input polynomial B[X]; and a cryptographic computation phase P2 during which the cryptographic device performs steps of the cryptographic algorithm using the polynomial result determined at the end of the multiplication phase. In addition, some steps of the cryptographic algorithm, which are independent of the polynomial result, may be performed before the multiplication phase P1 or during the execution of the multiplication phase in parallel to it.

The multiplication phase P1 comprises an integer generation step S11 during which the cryptographic device generates for each input polynomial a concatenated integer as a concatenation of the coefficients of the input polynomial, each coefficient being extended to an extension size Ne with $N_e \geq \lceil \log_2 Nc \rceil + 2*N_b$ by inserting zeros as Most Significant Bits MSB of said concatenated coefficients. Selecting such an extension size ensures that, in the integer multiplication result, terms won't be superimposed as a result of the carry application and that the coefficients of A[X]*B[X] can be easily recovered from the integer multiplication result.

During this step, for each input polynomial, the cryptographic device may either first extend the size of each coefficient to the extension size Ne by inserting zeros and then concatenate extended coefficients into the concatenated integer, or first concatenate the original coefficients of the input polynomial into an intermediary integer and then generate the concatenated integer by inserting zeros between each group of bits of the intermediary integer corresponding to an original coefficient.

As an example, if the first input polynomial A[X] is equal to $$\sum_{i=0}^{i=9} ai * x^i$$

with a size of the coefficients Nb equal to 10 and a0=1000000001
a1=1000000011
a2=1000000101
a3=1000001001
a4=1000010001
a5=1000100001
a6=1001000001
a7=1010000001
a8=1100000001
a9=1111111111 then, the concatenated integer for A[X] when the extension size Ne is equal to 12 will be

| a9 | a8 | a7 | a6 | a5 |
|---|---|---|---|---|
| 001111111111 | 001100000001 | 001010000001 | 001001000001 | 001000100001 |
| a4 | a3 | a2 | a1 | a0 |
| 001000010001 | 001000001001 | 001000000101 | 001000000011 | 001000000001 |

The multiplication phase P1 then comprises an integer multiplication step S12 during which the cryptographic device computes, using said integer multiplier of the co-processor, a multiplication of the concatenated integers generated at the integer generation step S11 to obtain a multiplication result, which is an integer.

Thanks to the zeros inserted in the concatenated integers and spacing the original coefficients of the input polynomial from each other, the multiplication carry does not generate an extra mixing of Rij terms in the multiplication result. Therefore, the multiplication phase P1 then comprises a polynomial multiplication step S13 during which the cryptographic device determines, from the multiplication result obtained at the integer multiplication step S12, the polynomial result R [X] of the polynomial multiplication between said first input polynomial A[X] and said second input polynomial B[X]. In this step, the cryptographic device determines the coefficients of R[X] from the multiplication result of step S12. In an embodiment, such a determination comprises obtaining the coefficients of the polynomial result R[X] from the least significant bits (LSB) of each block of bits of length equal to the extension size Ne of the multiplication result of step S12.

Finally, the cryptographic device performs steps of the cryptographic algorithm using the polynomial result determined at the end of the multiplication phase in a computation step S21 of the cryptographic computation phase P2.

A limitation of this method is the maximal integer size that the integer multiplier of the co-processor can managed when computing the multiplication result at the integer multiplication step S12. Indeed, in order to avoid any overflow, the integer multiplier has to be able to manage a result size $N_{copro}$ with $N_{copro} \geq 2*N_e*N_c$ (bits).

When $N_c = 32$ and $N_b = 13$, $N_e \geq 31$ and $N_{copro} \geq 1984$

When $N_c = 64$ and $N_b = 13$, $N_e \geq 31$ and $N_{copro} \geq 4096$

When $N_c = 128$ and $N_b = 13$, $N_e \geq 31$ and $N_{copro} \geq 8448$

When $N_c = 256$ and $N_b = 13$, $N_e \geq 31$ and $N_{copro} \geq 17408$

As a result, when the integer multiplier is only able to handle a number of bits $N_{copro}$ corresponding to input polynomials with a maximal number of coefficients $N_{Cmax}$, it is not possible to compute the polynomial result of the multiplication between two large input polynomials $\psi_1$[X] and $\psi_2$[X] having a number of coefficients bigger than the maximal number of coefficients $N_{Cmax}$, for example with 256 or 128 coefficients of size 13 bits, by directly applying the method described above to these input polynomials.

In such a case, the cryptographic algorithm to be performed may compute the multiplication between these two large input polynomials $\psi_1$[X] and $\psi_2$[X] using Karatsuba algorithm. This algorithm enables to replace a single polynomial multiplication by plural polynomial multiplications between polynomial of a size reduced by a factor 2. Karatsuba algorithm may be applied multiple times recursively until the size of the polynomial to be multiplied is low enough to compute it with the integer multiplier using the method described above. Therefore, performing Karatsuba algorithm in such a case comprises the computation of polynomial multiplications using the integer multiplier by the steps of the multiplication phase P1 of the method described above. In such a case, during the cryptographic computation phase P2, the cryptographic device performs the cryptographic algorithm based on the result of the execution of Karatsuba algorithm.

An example is given on FIG. 6 in which the polynomial multiplication between two 256-coefficients polynomials is replaced by recursively calling three time Karatsuba algorithm (Karatsuba_256, Karatsuba_128 and Karatsuba_64) such that the 256-coefficients polynomials multiplication boils down to 27 32-coefficients polynomials multiplications (copro_multiply) which are performed using the integer multiplier of the co-processor as described above in steps S11, S12 and S13.

In order to protect a polynomial multiplication performed according to the method presented above against side channel attacks, the coefficients of the input polynomials A[X] and B[X] may be blinded.

In a first embodiment, at the integer generation step S11, before generating concatenated integers, the coefficients of the input polynomials are masked using a multiplicative masking. For example, each coefficient of A[X] ai with i in {0, . . . , Nc−1} may be multiplied by a random mask rnd modulo q with q=2^Nb, and each coefficient of B[X] bi with i in {0, . . . , Nc−1} may be masked by the inverse of the mask used for masking the coefficient of A[X] with the same index. By doing so the product of the mask coefficients with the same index is equal to the product of the original coefficients of this index.

$$a_i' = a_i * rnd \ \% \ q,\ b_i' = bi * rnd^{-1} \ \% \ q$$

$$a_i' * b_i' = a_i * b_i \ \% \ q$$

A unique random mask may be used for all the coefficients of A[X] or a different coefficient may be used for each coefficient.

The masked coefficients are then used by the cryptographic device for generating the concatenated integers.

In a second embodiment, at the integer generation step S11, before generating concatenated integers, the coefficients of at least one input polynomial are masked using an additive masking. For example, a random mask rnd1 may be multiplied by q=2^Nb and added to each coefficient of A[X] ai with i in {0, . . . , Nc−1}, and a random mask rnd2 may be multiplied by q=2^Nb and added to each coefficient of B[X] bi with i in {0, . . . , Nc−1}. By doing so the product of the mask coefficients with the same index is equal to the product of the original coefficients of this index plus a random value depending on rnd1 and rnd2 that is a multiple of q and may be removed by a simple modulo q operation.

$$a_i' = a_i + rnd1 * q,\ b_i' = bi + rnd2 * q$$

$$a_i' * b_i' = a_i * b_i + rnd1 * q * b_i + rnd2 * q * a_i + rnd1 * rnd2 * q^2$$

The masked coefficients are then used by the cryptographic device for generating the concatenated integers.

In a third embodiment, at the integer multiplication step S12, before computing using the integer multiplier the multiplication of the generated concatenated integers, the concatenated integers are masked using multiplicative blinding. For example, if the concatenated integers corresponding to A[X] and B[X] are noted "a" and "b, "a" may be masked using a random number $r_1$ and "b" using another random number $r_2$, a modulo q with q=2^Nb being applied to each group of bits corresponding to an original coefficient of an input polynomial. The masked concatenated integers are then used for computing the multiplication of concatenated integers and the result of the product a*b may be retrieved by multiplying the masked multiplication result by the inverse of the random masks $r_1$ and $r_2$.

$$c = [(a * r_1) * (b * r_2) \% \ q] * (r_1 * r_2)^{-1} \% \ q$$

Finally, the method according to the invention enables to compute polynomial multiplications between large polynomials at a low cost by narrowing it to one or more integer multiplications, if needed in the frame of the application of Karatsuba algorithm in order to reduce the number of coefficients of the input polynomials of the integer multiplications. It can even be easily protected against side channel analysis by applying additive or multiplicative blinding to the inputs of the integer multiplications.

According to a second aspect, this invention therefore relates also to a computer program product directly loadable into the memory of at least one computer, comprising software code instructions for performing the steps of the method described here above when said product is run on the computer.

According to a third aspect, this invention therefore relates also to a non-transitory computer readable medium storing executable computer code that when executed by a cryptographic device comprising a processing system having at least one hardware processor performs the method described here above.

According to a fourth aspect, this invention therefore relates also to a cryptographic device 101 illustrated in FIG. 2 and comprising:

- a processing system having at least one hardware processor 201*a* and a cryptographic co-processor 201*b* comprising an integer multiplier, said processing system being configured to perform the steps of the methods according to the first 10 aspect,
- at least one memory 203, 204, 205 for storing the input polynomial coefficients and the results of the calculations performed during the different computing steps.

The invention claimed is:

1. A method for performing a cryptographic algorithm, performed by a resource-constrained cryptographic device comprising a cryptographic co-processor comprising an integer multiplier, said cryptographic algorithm comprising a polynomial multiplication between a first input polynomial A[X] and a second input polynomial B[X], wherein the first input polynomial A[X] and the second input polynomial B[X] comprise Nc coefficients and said coefficients of the first and second input polynomials are of size Nb bits, with Nc and Nb non-zero integers, wherein Nc≥32 and Nb≥10, said method comprising:

computing (P1) a polynomial result of a polynomial multiplication between said first input polynomial A[X] and said second input polynomial B[X] by:

for each input polynomial, generating (S11) a concatenated integer as a concatenation of the coefficients of said input polynomial, each coefficient being extended to a size Ne with $N_e \geq \lceil \log_2 Nc \rceil + 2*N_b$ by inserting zeros as Most Significant Bits of said concatenated coefficients, computing (S12) using said integer multiplier a multiplication of said generated concatenated integers to obtain a multiplication result, determining (S13) from said multiplication result said polynomial result of a polynomial multiplication between said first input polynomial A[X] and said second input polynomial B[X], performing (S21) said cryptographic algorithm using said determined polynomial result.

2. The method of claim 1, wherein determining said polynomial result comprises obtaining coefficients of said polynomial result from least significant bits of each block of bits of length Ne of said multiplication result.

3. The method of claim 1, wherein said cryptographic algorithm comprises computing a multiplication between two polynomials, having a number of coefficients bigger than the number of coefficients Nc of said input polynomials, using Karatsuba algorithm and performing Karatsuba algorithm comprises the computation of the polynomial multiplication between said input polynomials (S11, S12, S13) according to the step a), and the step of performing said cryptographic algorithm b) is based on a result of performing Karatsuba algorithm.

4. The method of claim 1, wherein, before generating concatenated integers (S11), coefficients of said input polynomials are masked using additive or multiplicative masking, and said masked coefficients are used for generating concatenated integers.

5. The method of claim 1, wherein, before computing using said integer multiplier a multiplication of said generated concatenated integers (S12), said concatenated integers are masked using multiplicative blinding, and said masked concatenated integers are used for computing said multiplication of concatenated integers.

6. The method of claim 1, wherein the cryptographic algorithm is among: a signature generation, encapsulation, decapsulation, public key encryption or decryption, password-based key exchange algorithm.

7. A resource-constrained cryptographic device comprising:

a processing system having at least one hardware processor and a cryptographic co-processor comprising an integer multiplier for performing a cryptographic algorithm; and at least one memory for storing the input polynomial coefficients and the results of the calculations performed during the different computing steps, said cryptographic algorithm comprising a polynomial multiplication between a first input polynomial A[X] and a second input polynomial B[X], wherein the first input polynomial A[X] and the second input polynomial B[X] comprise Nc coefficients and said coefficients of the first and second input polynomials are of size Nb bits, with Nc and Nb non-zero integers, wherein Nc≥32 and Nb≥10, said resource-constrained cryptographic device performing:

computing (P1) a polynomial result of a polynomial multiplication between said first input polynomial A[X] and said second input polynomial B[X] by:

for each input polynomial, generating (S11) a concatenated integer as a concatenation of the coefficients of said input polynomial, each coefficient being extended to a size Ne with $N_e \geq \lceil \log_2 Nc \rceil + 2*N_b$ by inserting zeros as Most Significant Bits of said concatenated coefficients, computing (S12) using said integer multiplier a multiplication of said generated concatenated integers to obtain a multiplication result, determining (S13) from said multiplication result said polynomial result of a polynomial multiplication between said first input polynomial A[X] and said second input polynomial B[X], performing (S21) said cryptographic algorithm using said determined polynomial result.

* * * * *